July 23, 1929.  W. L. O'BRIEN  1,721,636
MACHINE FOR FORMING ARMATURE CONDUCTORS
Filed March 30, 1923  9 Sheets-Sheet 3

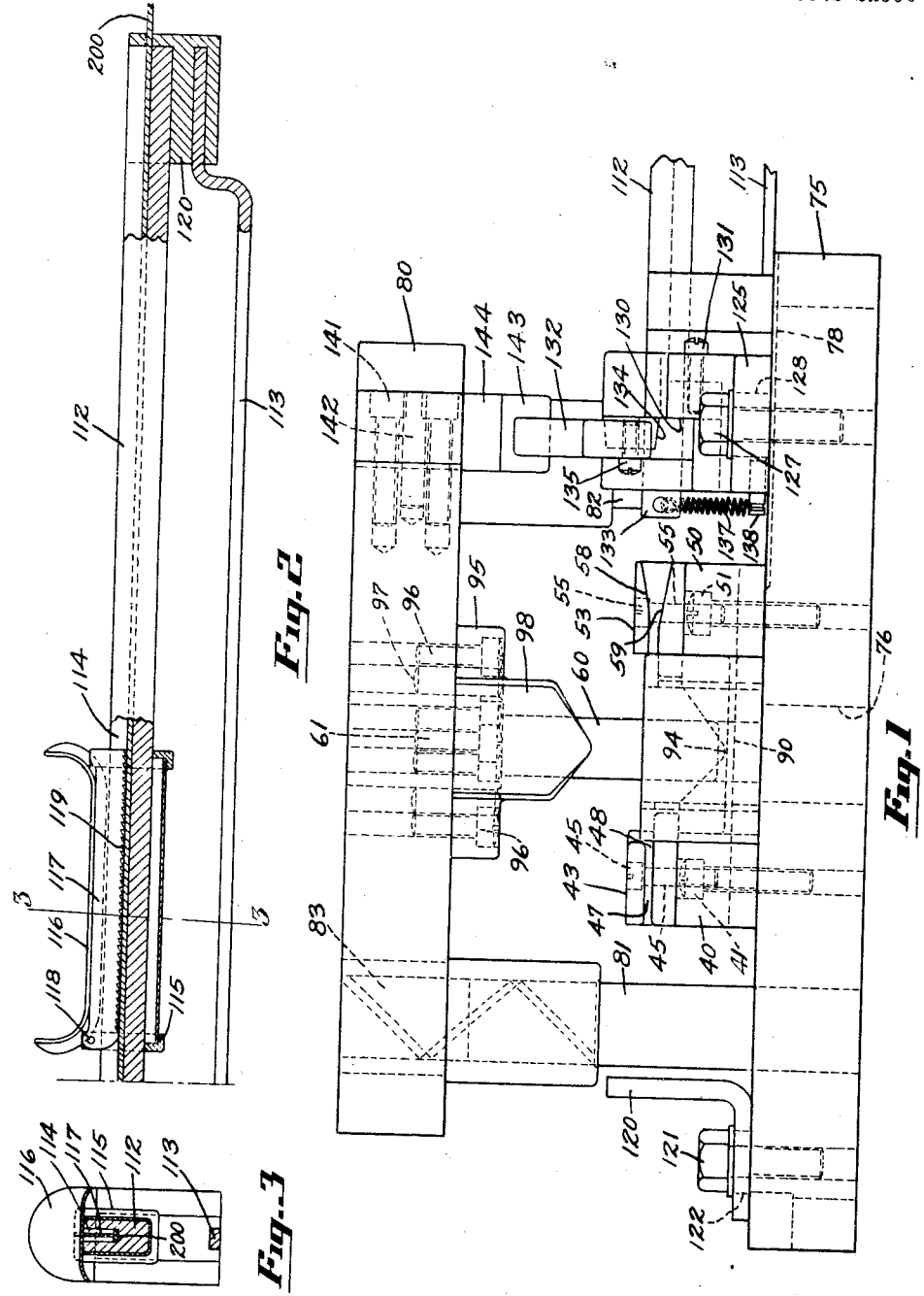

Witnesses
Irvin A. Greenwald
J. W. McDonald

Inventor
William L. O'Brien
By Frederick J. Hardman
his Attorney

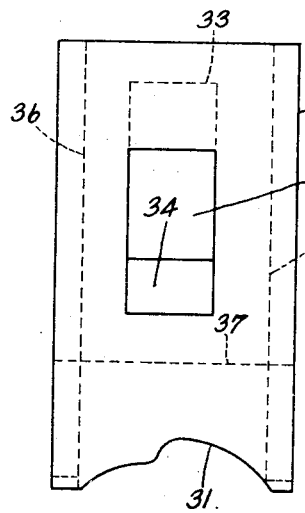

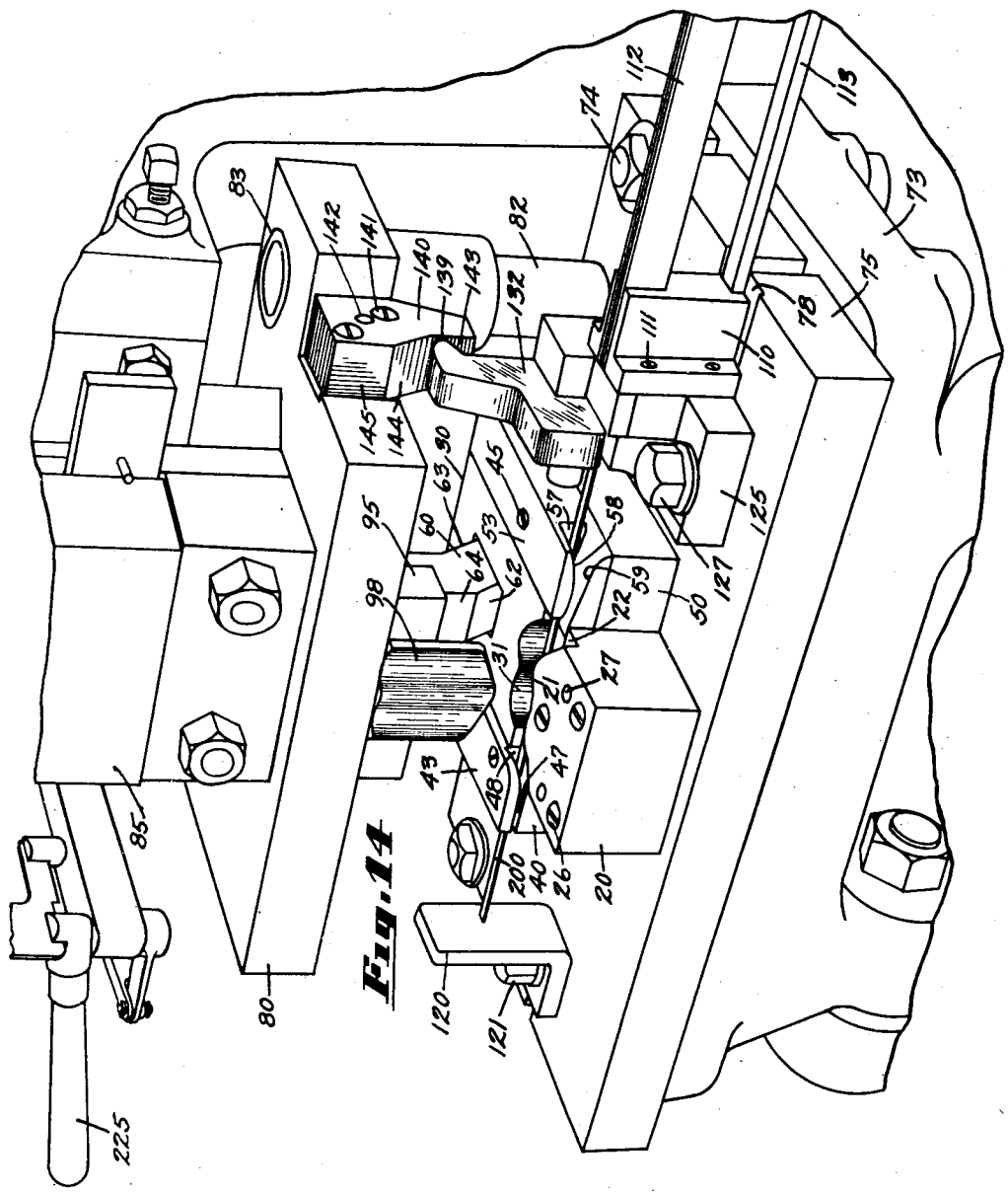

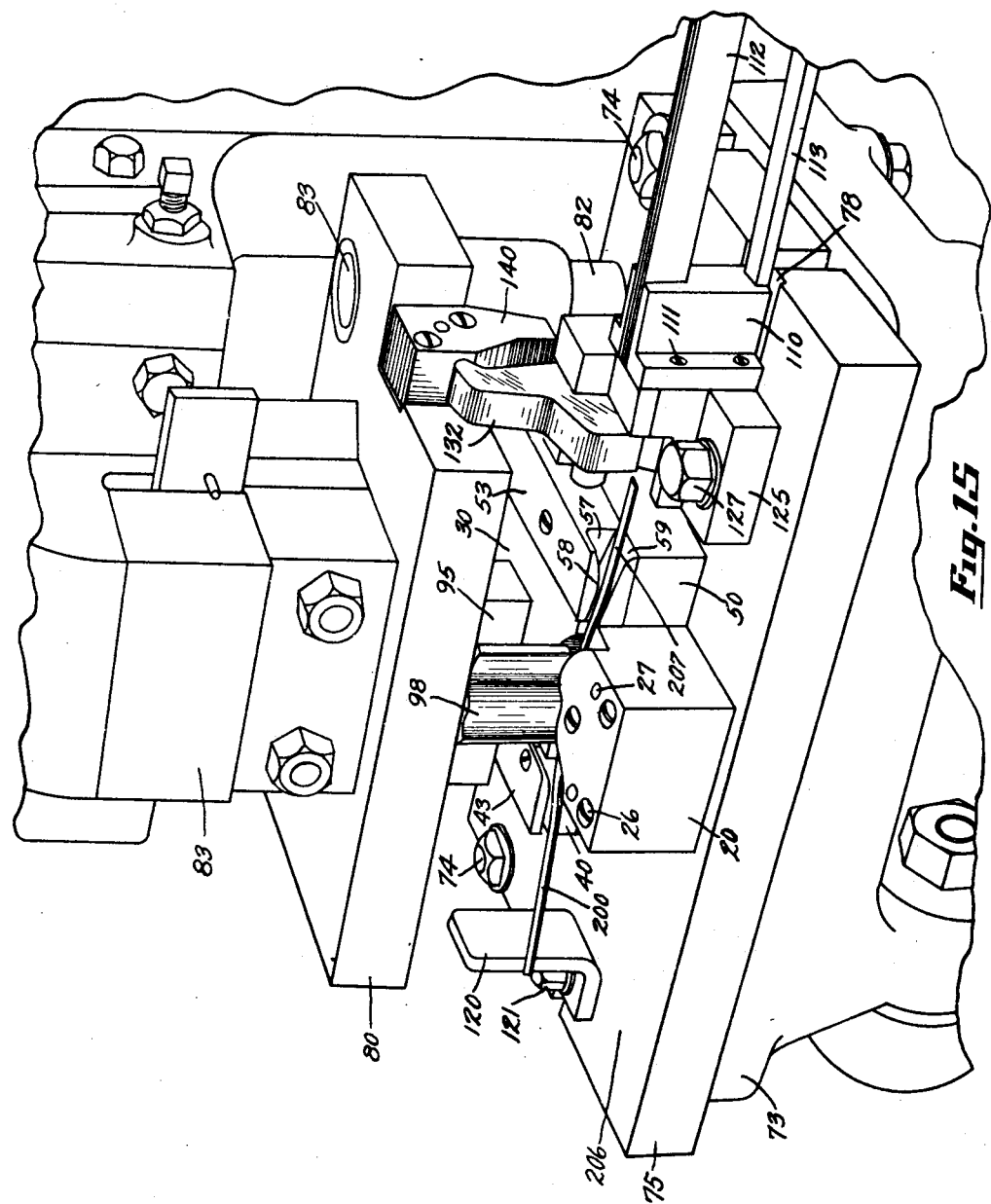

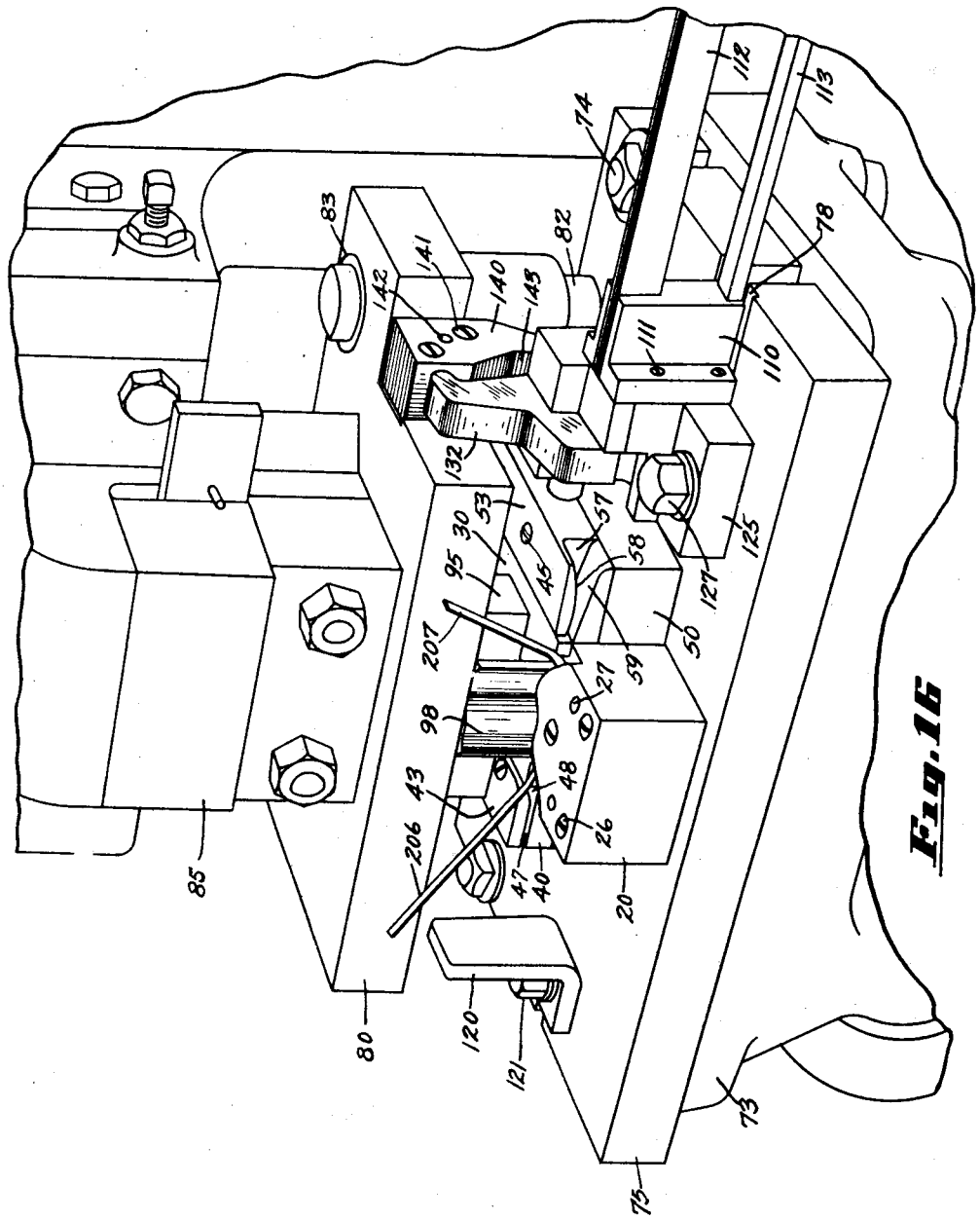

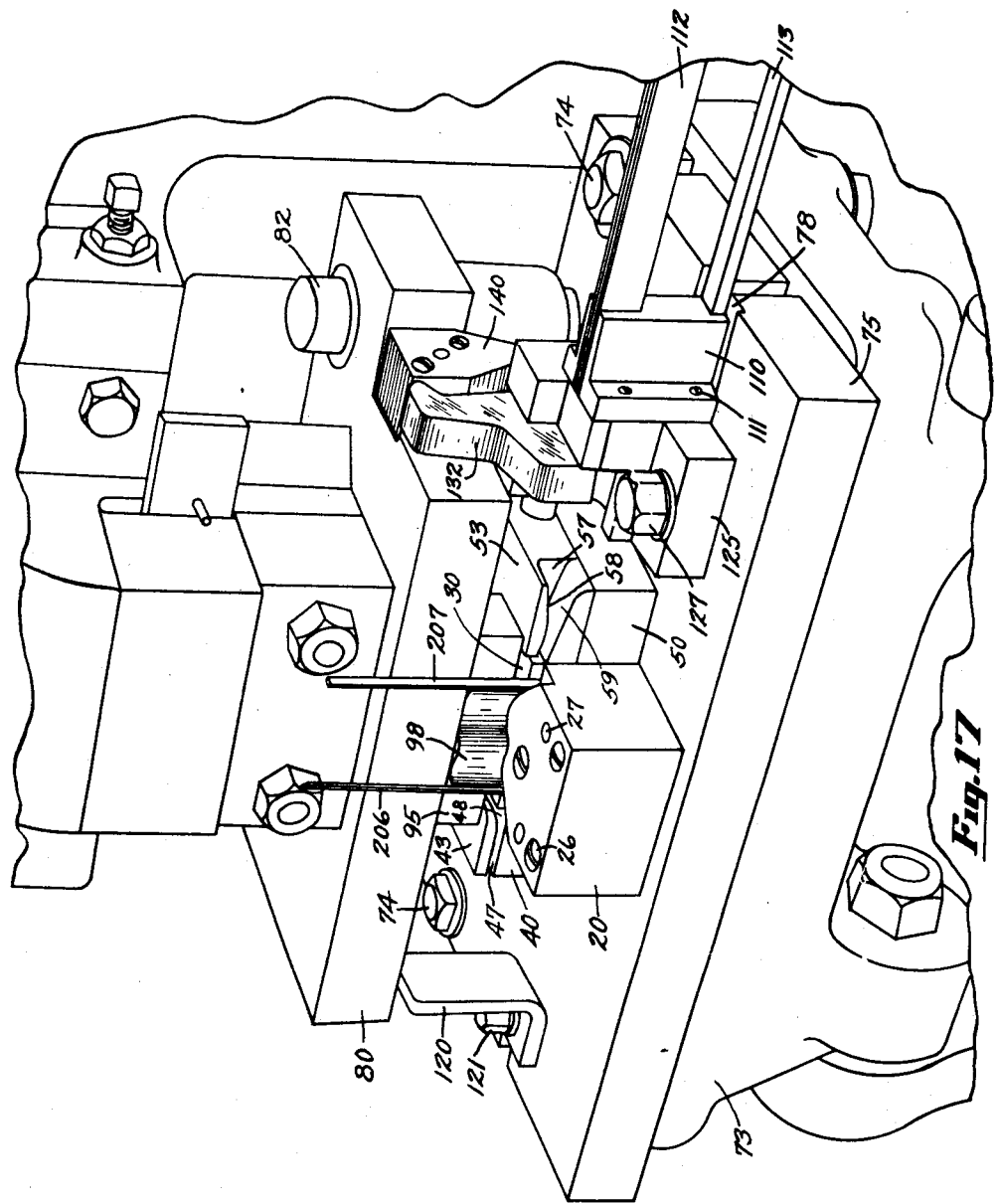

July 23, 1929.     W. L. O'BRIEN     1,721,636
MACHINE FOR FORMING ARMATURE CONDUCTORS
Filed March 30, 1923     9 Sheets-Sheet 9

Witnesses
Irvin A. Greenwald
J. W. McDonald

Inventor
William L. O'Brien
By Frederick J. Hardman
His Attorney

Patented July 23, 1929.

1,721,636

UNITED STATES PATENT OFFICE.

WILLIAM L. O'BRIEN, OF DAYTON, OHIO, ASSIGNOR, BY MESNE ASSIGNMENTS, TO DELCO-REMY CORPORATION, OF DAYTON, OHIO, A CORPORATION OF DELAWARE.

MACHINE FOR FORMING ARMATURE CONDUCTORS.

Application filed March 30, 1923. Serial No. 628,768.

This invention relates to the manufacture of single turn bar conductors or "hairpins" for armatures of dynamo-electric machines.

One of the objects of the present invention is to provide a forming die mechanism which is adapted to be operated by a punch press and which will automatically cut off pieces of bar stock and form them into hairpin conductors.

Another object of the invention is the provision of means for feeding bar stock into the forming die mechanism which is adapted to be operated by one hand of the operator, allowing use of the other hand to control the punch press.

Other and further objects and advantages of the present invention will be apparent from the following description, reference being had to the accompanying drawings, wherein a preferred form of embodiment of the invention is disclosed.

In the drawings:

Fig. 1 is a front view of the hairpin forming mechanism.

Fig. 2 is a side view of the feeding mechanism, certain parts thereof being shown in section for the sake of clearness.

Fig. 3 is a sectional view taken on the line 3—3 of Fig. 2.

Figure 4A:
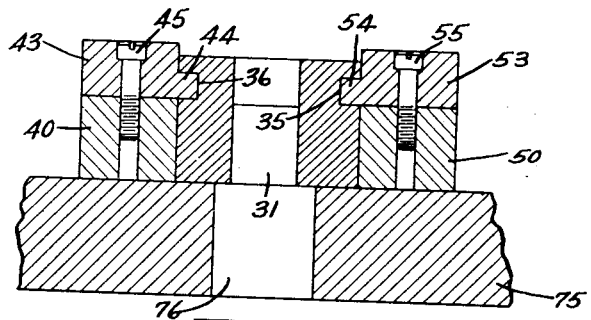
Fig. 4 is a side view of the shearing mechanism.
Figure 4:
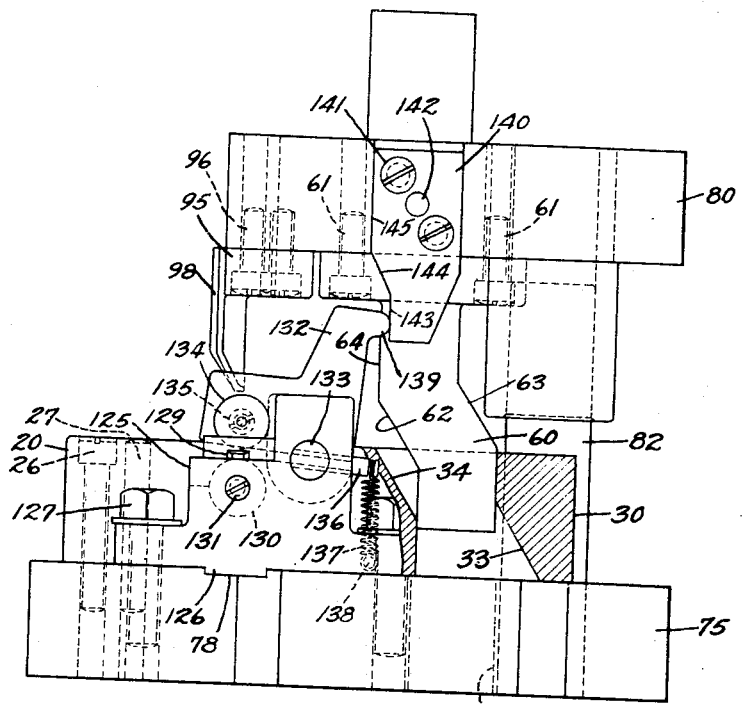
Figure 5:
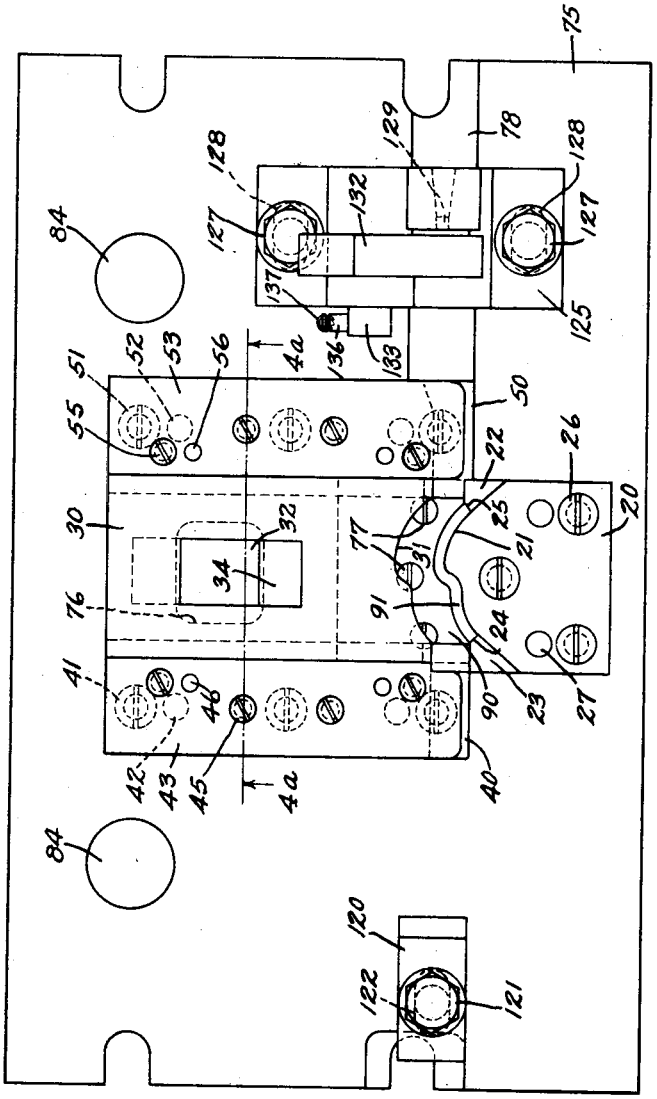

Fig. 4$^a$ is a sectional view on the line 4$^a$—4$^a$ of Fig. 5.

Fig. 5 is a top plan view of the coplanar-bending mechanism and of the shearing mechanism.

Fig. 6 is a top plan view of the movable coplanar-bending die member.

Fig. 7 is a side view of the die shown in Fig. 6.

Fig. 8 is a top plan view of the lower lateral-bending die element.

Fig. 9 is a front view of the die element shown in Fig. 8.

Fig. 10 is a top plan view of the stationary coplanar-bending die.

Fig. 11 is a side view of the die shown in Fig. 10.

Fig. 12 is a front view of the upper lateral-bending die.

Fig. 13 is a bottom plan view of the die shown in Fig. 12.

Figs. 14, 15, 16 and 17 are perspective views of the hairpin forming machine, showing various stages of operation from the time the stock is inserted into the machine until the hairpin loop has been formed.

Figure 18:
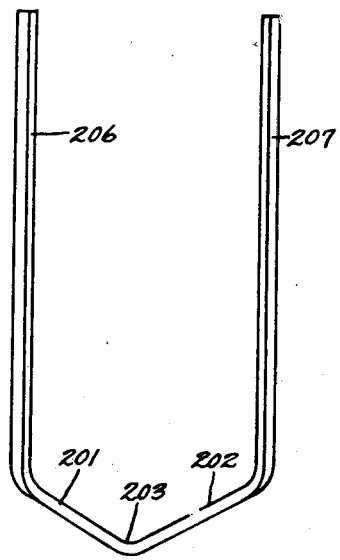

Fig. 18 is a view of a hairpin formed by means of the apparatus disclosed herein.

Figure 19:
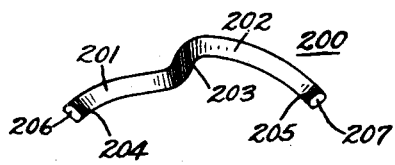

Fig. 19 is an upper end view thereof.

Figure 20:
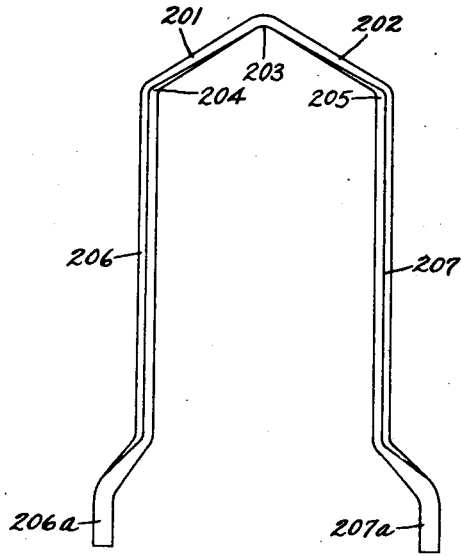

Fig. 20 is a view of the hairpin shown in Fig. 18, the ends of the branches thereof being bent to align them with certain commutator bars.

Figure 21:
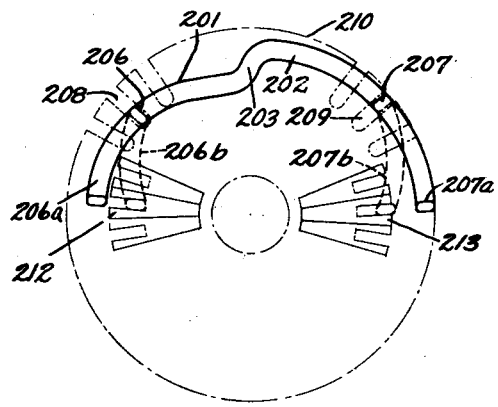

Fig. 21 is a view showing application of the hairpin loop to the armature of an electric machine.

The process of forming hairpin conductors which is carried out by the present invention includes the coplanar-bending of a piece of stock 200, so as to provide a yoke portion including off-set portions 201 and 202, the axes of which coincide substantially with concentric circles of different radii. The term "coplanar-bending" is intended to mean the bending of the stock so that all parts thereof may be located in a common plane; that is, the stock so bent may lie upon a plane surface with its parts resting upon such surface. Then the yoke is bent laterally at 203 substantially midway between the coplanar bent part joining the off-set portions to provide a V-shaped yoke, and the ends of the piece of stock are bent laterally at 204 and 205 to provide parallel legs or branches 206 and 207. The term "lateral-bending" is used to define the bending of portions of the stock away from the common plane occupied by the stock after being bent by the "coplanar-bending" operation.

The ends of the branches 206 and 207 are bent at 206$^a$ and 207$^a$ to register with certain commutator bars. Fig. 21 shows the hairpin assembled on a core 210 of a dynamo electric machine. The branches 206 and 207 are located in spaced slots 208 and 209 respectively. The portions 206$^a$ and 207$^a$ are forced into positions 206$^b$ and 207$^b$ respectively, wherein they are received by notches in commutator bars 212 and 213 respectively.

The invention as disclosed herein, comprises generally a punch and die apparatus, adapted to be attached to and operated by a punch press of the conventional type, wherein manually operable mechanism is employed to set the press plunger into motion, the press plunger returning to uppermost position automatically and then stopping automatically after one cycle of operation. The hairpin forming mechanism used in connection with the punch press includes manual means for feeding stock into the machine and up against a stop which measures the amount of stock to be consumed in forming the hairpin. After the necessary amount of stock has been fed into the machine, it is automatically sheared from the supply strip of bar stock, previous to the forming operation. The stock used in construction of hairpin loops of the present type is preferably of copper which readily lends itself to bending in any direction with respect to sides or edges.

The punch press operated mechanism of the present invention includes a punch and die mechanism for performing the coplanar-bending and lateral-bending operations referred to during the downward movement of the punch press head. The bar stock is fed manually to the mechanism and is severed by the downward movement of the press head.

*Coplanar-bending mechanism.*

Stationary coplanar-bending die 20, shown in Figs. 10 and 11, is provided with forming surface 21, the contour of which is such to conform with the required lower edge contour of the yoke portion (shown in Fig. 19) comprising the off-set portions 201 and 202. This die 20 is provided with notches 22 and 23 to receive the branches of the hairpins during the coplanar-bending operation and with forming surfaces 24 and 25 which cooperate with a die to be described to provide the bends 204 and 205, joining the parallel legs or branches 206 and 207 with the yoke portion. Die 20 is supported by means of a base block 75 and is attached thereto by bolts 26 and pins 27. Base block 75 is attached to the table 73 of a punch press by means of bolts 74.

Movable coplanar forming die 30, shown in Figs. 6 and 7, is provided with surface 31 which conforms with the required upper edge contour of the yoke portion as viewed in Fig. 19. Die 30 is provided with an aperture 32 having cam following surfaces 33 and 34 which are adapted to cooperate with a cam 60 to be described. Die block 30 is provided with parallel grooves 35 and 36 located on opposite sides thereof, and with a notch 37 to provide clearance for the die member 90 to be described. Die block 30 is supported for sliding movement upon the base or lower supporting block 75, and is slidable between blocks 40 and 50 secured to the base block 75 by screws 41 and 51, and dowels 42 and 52 respectively. Guide bars 43 and 53 are attached to blocks 40 and 50 respectively by means of screws 45 and dowels 46, and screws 55 and dowels 56 respectively. Guide bars 43 and 53 are provided with tongues 44 and 54 which are received by the grooves 36 and 35 respectively of the sliding block 30. The guide block 53 is provided at its front end with a notch 57 located between a beveled upper surface 58 and a beveled lower surface 59 to provide a flaring entrance to the notch 57 for the purpose of guiding the bar stock toward the forming dies. The guide bar 43 is provided with a notch 47 having a flaring entrance 48 to assist in guiding the stock as it is moved toward the stop 120.

Operating cam 60 is attached to upper die supporting block 80 by means of bolts 61. Block 80 is piloted with respect to block 75 by means of pilot posts 81 and 82 which are adapted to pass through holes 83 in block 80 and are received by holes 84 in block 75. Cam 60 is provided with camming surfaces 62 and 63 which cooperate with camming surfaces 34 and 33 respectively of the die 30 to slide die 30 relative to the die 20. Block 75 is provided with a clearance hole 76 for receiving the lower end of cam 60 when in downward position.

Block 80 is attached to the operating head or plunger 85 of the punch press in any suitable manner.

*Lateral-bending mechanism.*

Stationary die 90, shown in Figs. 8 and 9, is provided with a vertically extending projection 91 having a surface 92 adapted to coincide with surface 21 of block 20 (Fig. 10), and with a surface 93 adapted to be received by and coincide with surface 31 of die 30 (Fig. 6). The end view of projection 91 (Fig. 8) shows a configuration which would coincide with the view of the yoke portions 201 and 202 shown in Fig. 19. The projection 91 is provided with a V-notch 94, the contour of which conforms with the desired lower side contour of the yoke, such as shown in Fig. 18. Die 90 is secured to block 75 by screws 77 with its surface 92 located against the surface 21 of block 20.

Movable die 95, shown in Figs. 12 and 13, is attached to block 80 by screws 96 and pins 97, and is provided with a downwardly extending projection 98, the sectional contour of which is identical with the sectional contour of the projection 91 of the die 90. The side surface 99 of projection 98 is substantially in alignment with surface 92, and the side surface 100 is substantially in alignment with surface 93 of projection 91 of die 90. Projection 98 includes oblique forming surfaces 101 and 102 meeting at an apex 103, and with parallel side surfaces 106 and 107, meeting the surfaces 101 and 102 respectively at the corners 104 and 105 respectively. The projection 98 cooperates with the projection 91 of the lower lateral bending die 90 and with the surfaces 24 and 25 of the die block 20 to effect the lateral bending of the stock 200 into the form shown in Figs. 18 and 19. The surfaces of the projection 98 which are numbered 101 to 107 are adapted to engage the stock 200 to form the portions 206 to 207 respectively. The surfaces 106 and 107 cooperate with the forming surfaces 24 and 25 respectively of the block 20 to cause the hairpin branches 206 and 207 respectively to be bent around the corners 104 and 105 respectively of the projection 98. The dot and dash lines in Fig. 10 indicate the position of the hairpin relative to the block 20 after the bending operations have been completed.

*Feeding mechanism.*

The feeding mechanism comprises a bracket 110 attached to shear bracket 125 by bolts 111, and supporting a feed guide 112 and a supporting rod 113 therefor, joined at the opposite end by the connecting block 120. Shear bracket 125 is provided with a tongue 126 adapted to enter a groove 78 in base 75 and is therefore slidably guided by the base 75 when moved toward or from the forming dies. Bracket 125 is secured in various positions of adjustment by screws 127 passing through slots 128 in bracket 125 and threaded into base 75. Thus the feeding mechanism, and also the shear mechanism to be described, are capable of endwise adjustment with respect to the forming dies. Feed guide 112 is provided with a slot 114 through which the stock 200 is adapted to pass with one of its flat sides down and resting in the bottom of the slot. Sleeve member 115 is slidably mounted on feed guide 112 and is provided with an operating handle 116 secured to a hack saw blade 117 pivoted at 118 on sleeve 115 and adapted to travel longitudinally within the slot 114. It will be apparent that when the operating handle 116 is moved to the right, as shown in Fig. 2, and downward pressure of the hand is relieved, the teeth 119 of the blade 117 will ride over the stock 200, but when moved to the left or toward the shearing mechanism, and downward pressure of the hand is resumed, the teeth will bite into the stock 200 and carry it along through the slot 114.

The shear bracket 125 is provided with a hole 129 having a flaring entrance and similar in cross section to that of the stock 200 and adapted to receive the stock from the feeding mechanism. The notches 47 and 57, provided in guide bars 43 and 53 respectively, tend to retain the stock 200 between the die members 20 and 30 during a part of the edge bending operation. A stop member 120 is adjustably secured to the base 75 by bolt 121 passing through a slot 122 in stop 120 and screwed into base 75. Stop 120 serves as a limiting means for the feeding of stock 200 as it is fed toward the die mechanism. Inasmuch as the stop 120 and the shear mechanism are adjustable with respect to the base 75, it will be readily apparent that the length of the stock to be sheared may be varied in accordance with predetermined requirements, and the length of the hairpin branches may be varied.

*Shear mechanism.*

The shear mechanism shown in Fig. 4 comprises the shear bracket 125, heretofore referred to, upon which is mounted the stationary circular shearing blade 130 and attached thereto by screw 131. Lever arm 132, provided with nose 139, is attached to a shaft 133 mounted on bracket 125 and carries a circular shearing blade 134, attached thereto by screw 135. Pin 136 is press fitted into shaft 133 and has one end of spring 137 attached thereto, the other end of said spring being attached to pin 138 which is press fitted into bracket 125. This spring 137 tends to return shearing blade 134 to normal position after the shearing operation. This spring 137 also overcomes any sticking of the shearing blade 134 which might occur through friction with the stock 200. The circular shear blades 130 and 134 can be secured in various positions of angular adjustment to present fresh shearing surfaces.

Shear cam 140 is attached to block 80 by screws 141 and pin 142, and is provided with surfaces 143, 144 and 145 upon which the nose 139 of lever arm 132 is adapted to ride.

*Mode of operation.*

To operate the machine, stock 200 is first led off a supply reel through slot 114 of feed guide 112 until the stock engages with the teeth 119 of the blade 117. Then the operator shifts the operating handle 116 back and forth along the feed guide, each stroke to the left carrying the stock 200 still further toward the shear mechanism. As the feeding operation is continued, the stock 200 passes through hole 129 which is in alignment with the slot 114, then between the shearing blades 130 and 134, between beveled surfaces 58 and 59 of guide block 53, between dies 20 and 30, through flaring entrance 48 of notch 47 until the stock 200 strikes against the adjustable stop 120. The amount of stock which is to be cut off has thus been measured, the length of said stock being the distance between the shearing blades 130 and 134 and the stop 120. Fig. 14 shows the stock 200 after the feeding is completed.

The operator then moves a handle 225 for operating the punch press, and the block 80 starts downward toward block 75. On this downward movement of block 80, the cam 140 also moves downward, the nose 139 of lever arm 132 riding on surface 143. As the downward movement continues, the nose 139 will be engaged by the surface 144, tending to move the lever arm 132 counter-clockwise, thus bringing the shearing blade 134 into contact with the stock 200 and effecting the shearing thereof. When the shearing operation has been completed, it will be noted that the shears are held in closed position since the nose 139 rides on the surface 145 of cam 140.

This same downward movement of the block 80 has likewise carried the cam 60 downward so that the surface 62 engages with the camming surface 34 of the movable die 30 and cams die 30 toward the die block 20. As the die 30 continues to move toward the die 20, the ends of the stock 200 are pushed out of the notches 47 and 57 in guide blocks 40 and 50 respectively, and the central portion of the stock is compressed between the surfaces 31 and 21 to give to the yoke portion of the hairpin the desired edgewise contour, such as shown in Fig. 19, thus completing the coplanar-bending operation.

The moving parts of the mechanism, at the completion of the coplanar-bending operation have been moved to positions shown in Fig. 15, in which the shear mechanism is in closed position, the movable die is in its most forward position and its surface 31 is spaced from the forming surface 21 of block 20 by an amount equal to the width of the stock 200. The dies 20 and 30 now cooperate to provide a female member for receiving the partly formed yoke portion of the work, and the die 95 as it proceeds toward die 90. Fig. 15 shows die 95 entering between the surfaces 31 and 21, and the point of die 95 has engaged the stock 200.

As the block 80 moves downwardly still further, the die 95 will force the central portion of the stock 200 down into the V-notch 94 to effect the lateral-bending of the stock to bend the yoke at 203 and the branches at 204 and 205. Continued downward movement of the die 95 tends to throw the ends of the stock upward as shown in Fig. 16, at the same time pressing the stock against the forming surfaces 24 and 25 to effect the bends 204 and 205, as shown in Fig. 19.

Fig. 17 shows the branches 206 and 207 of the conductor projecting upward along the surfaces 106 and 107 of die 95, at which time the formation of the conductor or hairpin has been completed.

The block 80 is returned to uppermost position by the operation of the punch press plunger 85 which is arrested in uppermost position in the usual mode of operation of punch presses provided with a non-repeat device. Upward movement of block 80 causes the bending mechanism to return to positions shown in Fig. 14. The completed hairpin is removed.

The forming operation is repeated by first feeding in the stock with a movement of the feeding sleeve 115 toward the machine, said movement being effected by the right hand of the operator in the device illustrated. Then the control lever 225 is operated with the left hand to render the punch operative for one cycle of movement.

The shears prevent feeding the stock into the die until the block 80 is returned to uppermost position. Therefore the operator cannot feed stock while the bending operations are being performed.

The forming operations can be repeated in rapid succession, since but one rapid movement of the hand to move the feeding sleeve 115 is all that is required to feed the stock into the bending apparatus. This movement is followed by a quick movement of the other hand to move the control lever 225. Therefore the operations can be performed nearly as rapidly as the usual simple punching operations when the stock is fed manually to the punch and die mechanism of the punch press and the press is tripped manually.

While the form of mechanism herein shown and described constitutes a preferred form of embodiment of the present invention, it should be understood that various changes and alterations may be made therein without departing from the scope of the claims which follow.

I claim:

1. Apparatus for forming hairpin conductors from bar stock, comprising in combination, bending mechanism including a stationary and a movable member for bending bar stock in one direction and then forming a female die portion; bending mechanism including a movable male die member for bending the stock in another direction by forcing it into said female die portion; an actuator movable in the direction of movement of the male die member of the second mentioned bending mechanism for moving the movable member of the first mentioned bending mechanism; and a common member for supporting and moving said actuator and the male die member of the second mentioned bending mechanism.

2. Apparatus for forming hairpin conductors from bar stock, comprising in combination, bending means including a stationary and a movable member for bending the stock so as to provide an intermediate section including offset portions, the axes of which approximately coincide with concentric arcs, the end sections extending in the same plane with the intermediate section in diverging relation, and the bending members together forming a female die portion in this position; means including a male die member adapted to cooperate with the said female portion, for bending each end section which is contiguous therewith, whereby to provide a hairpin conductor having parallel branch portions adapted to be located upon an armature core at different distances from the axis of the core.

3. In apparatus for forming hairpin conductors from bar stock, the combination with coplanar-bending mechanism including die members, one movable relatively to the other; of lateral-bending mechanism for shaping the yoke of the hairpin and including a fixed die located between the coplanar-bending dies, and a die movable between the coplanar-bending dies; and means for moving both of said movable die members toward the stock simultaneously.

4. In apparatus for forming hairpin conductors from bar stock, the combination with coplanar-bending mechanism including die members, one movable relative to the other; of lateral-bending mechanism for shaping the yoke of the hairpin and including a fixed die located between the coplanar-bending dies and a die movable between the coplanar-bending dies; and means for moving the movable coplanar-bending die member into engagement with the stock before the lateral-bending die engages the stock.

5. In apparatus for forming hairpin conductors from bar stock, the combination with coplanar-bending mechanism including die members, one movable relative to the other; of lateral-bending mechanism including a die located between the coplanar-bending dies and including a die movable between the coplanar-bending dies; and common means for moving the coplanar-bending die member into engagement with the stock, and then for causing the lateral-bending die to engage the stock while the stock is confined between the edgewise bending die members.

6. Apparatus for forming hairpin conductors from bar stock, comprising in combination, bending mechanism including a sliding member for bending the bar stock in one direction, said member having camming surfaces; bending mechanism including a die movable transversely to the sliding member for bending the stock in another direction; means for operating the transversely-movable die; and a cam supported by said means for cooperating with the camming surfaces of the slidable member for operating the same.

7. In apparatus for forming hairpin conductors from bar stock, the combination with bending die mechanism including relatively movable members for bending bar stock in one direction; bending mechanism including a die movable transversely to the slidable member, for bending the stock in another direction; a stock-shearing mechanism in alignment with the first mentioned bending mechanism; and means movable in the direction of movement of the second movable die member, for moving both movable die members and operating the stock-shearing mechanism.

8. In apparatus for forming hairpin conductors, the combination with coplanar-bending mechanism including a movable member; of lateral-bending mechanism including a member movable in a direction transverse to the first mentioned movable member; shearing mechanism including a movable blade; cam means for operating the blade; cam means for operating the first mentioned movable member, and a member having straight line motion for both cam means and transversely movable member, and for actuating said means and transversely movable member.

9. In apparatus for forming hairpin conductors, the combination with coplanar-bending mechanism including a horizontally slidable die; of lateral-bending mechanism including a vertically movable die; shearing mechanism including a movable blade; a vertically movable member supporting the vertically movable die; and camming devices for actuating said horizontally movable die and the shear blade, said devices including cam members supported by the vertically movable member.

10. In apparatus for forming hairpin conductors, the combination with a punch press having a table and a plunger; of a base block adapted to be mounted on the table; an upper supporting block adapted to be attached to the plunger; coplanar-bending mechanism mounted on the base block and including a movable die member provided with camming surfaces; lateral-bending mechanism including a movable member attached to the upper supporting block; cam means attached to the upper supporting block and adapted to cooperate with the camming surfaces provided on the movable coplanar-bending die; a shear cam attached to the upper supporting block; and shearing mechanism including a movable blade adapted to be operated by said shear cam.

11. In apparatus for forming hairpin conductors, the combination with a punch press having a table and a plunger; of a base block adapted to be mounted on the table; an upper supporting block adapted to be attached to the plunger; bending mechanism supported by the base block and including a movable member; mechanism operated by the upper supporting block for controlling the movable member; a shear cam attached to the upper supporting block; and shearing mechanism including a movable blade adapted to be operated by said shear cam.

12. In apparatus for forming hairpin conductors, the combination with a punch press having a table and a plunger; of a base block adapted to be mounted on the table; an upper supporting block adapted to be attached to the plunger; a stationary coplanar-bending die and a horizontally movable coplanar-bending die supported by the base block; a stationary lateral-bending die supported by the base block between the coplanar-bending dies; a vertically movable lateral-bending die supported by the upper supporting block; and means including a cam attached to the upper supporting block for moving the coplanar-bending movable die horizontally.

13. In apparatus for forming hairpin conductors from bar stock, the combination with bending mechanism; of stock feeding mechanism including a guide in which the bar stock is adapted to slide; a slotted sleeve fitting about said guide and endwise movable along said guide; and a manually operable lever pivotally attached in the slot of said sleeve, said lever being provided with teeth adapted to engage and move the stock when the sleeve is gripped by the operator and moved in one direction.

14. In apparatus for forming hairpin conductors from bar stock, the combination with bending mechanism; of stock feeding mechanism including a channeled guide adapted to receive bar stock; a slotted sleeve about the guide and endwise movable along said guide; and a manually operable lever pivoted in the slot at the end of the sleeve nearest the bending mechanism, said lever being provided with a toothed portion, the teeth of which point toward the bending mechanism, for engaging and moving the stock when the sleeve is gripped by the operator and moved in one direction.

15. In apparatus for forming hairpin conductors from bar stock, the combination with coplanar-bending mechanism including stationary and movable die blocks provided with companion coplanar-bending surfaces; of lateral bending mechanism including a member movable between said coplanar-bending dies while the stock is confined between said dies, said lateral-bending mechanism including corner portions on said movable lateral-bending die and also parallel side surfaces adapted to be received between parallel companion surfaces provided on the first mentioned stationary block, whereby the stock is bent about the corners of the movable lateral-bending die as said die is moved between the coplanar-bending die members.

16. Apparatus for forming hairpin conductors from bar stock, comprising in combination, a pair of relatively movable die members for bending a bar in one direction; relatively movable male and female die members for bending the bar in a direction transverse to the first mentioned direction of bending, said female die member having side walls provided by said pair of relatively movable die members when in nearest spaced relation; and means for operating said die members.

17. Apparatus for forming hairpin conductors from bar stock, comprising in combination, coplanar bending mechanism including relatively movable members for bending a bar in one direction with its parts lying in a common plane; lateral bending mechanism including a male die member adapted to cooperate with said first mentioned bending mechanism and move transversely relative thereto to bend the bar in another direction so that its parts are bent out of said common plane; and means movable in the direction of movement of the male die member, for operating said male die member and the coplanar-bending mechanism.

18. Apparatus for forming hairpin conductors from bar stock, comprising in combination, coplanar bending mechanism including a movable member for bending a bar in one direction with its parts lying in a common plane; lateral bending mechanism including a member transversely movable relative to the first mentioned bending mechanism for bending the bar in another direction so that its parts are bent out of said common plane; and means, movable in the direction of the transversely movable member to operate said member and the first mentioned movable member.

19. Apparatus for forming hairpin conductors from bar stock, comprising in combination, coplanar bending mechanism including relatively movable members for bending the bar in one direction with its parts lying in a common plane, said coplanar-bending mechanism then cooperating to form a female die portion; lateral bending mechanism including a movable male die member adapted to cooperate with said female die portion to bend the bar in another direction so that its parts are bent out of said common plane; and means movable in the direction of the male die member for operating said die member and the first mentioned bending mechanism.

20. Apparatus for forming hairpin conductors from bar stock, comprising in combination, bending mechanism including a stationary member and a member movable toward the stationary member until the distance between said members is equal substantially to the width of the bar, for bending said bar in one direction, said members cooperating to form a female die portion; and bending mechanism including a male die member movable transversely to the first mentioned bending mechanism and adapted to engage the bar and force it through the female die portion to bend it in another direction.

21. Apparatus for forming hairpin conductors comprising, in combination, a coplanar-bending mechanism including respectively fixed and movable die members; lateral-bending mechanism including respectively fixed and movable die members, the movable die of the lateral-bending mechanism having movement between the members of the coplanar-bending mechanism and in a direction transverse to the movement of the movable coplanar-bending die; and means for causing the mechanisms successively to bend a piece of stock.

22. Apparatus for forming hairpin conductors comprising, in combination, mechanism for bending an intermediate portion of a piece of stock in one plane to produce the desired configuration of the hairpin yoke as it appears in the end view of the conductor, and including respectively fixed and movable die members; mechanism for gripping the formed intermediate portion and for bending the same so as to produce the desired configuration of the hairpin yoke as it appears in the plan view of the conductor, and for forming the branches of the conductor, said mechanism including respectively fixed and movable die members; and means for causing said mechanisms successively to bend a piece of stock.

In testimony whereof I hereto affix my signature.

WILLIAM L. O'BRIEN.